May 29, 1956   L. E. MULLER   2,747,495
REFRIGERATED AIR DISTRIBUTING APPARATUS
Filed Dec. 26, 1952   2 Sheets-Sheet 2

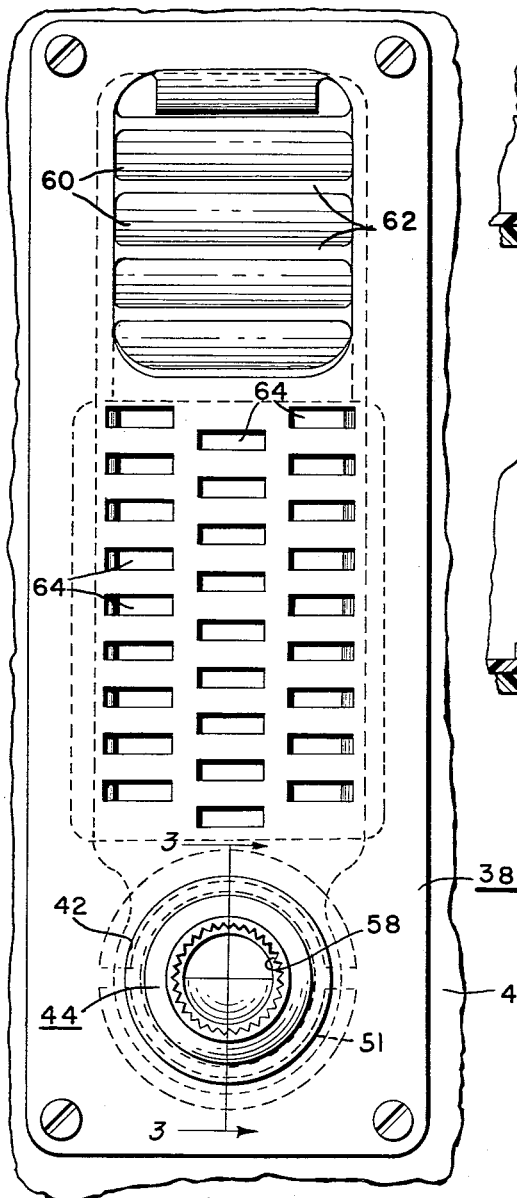
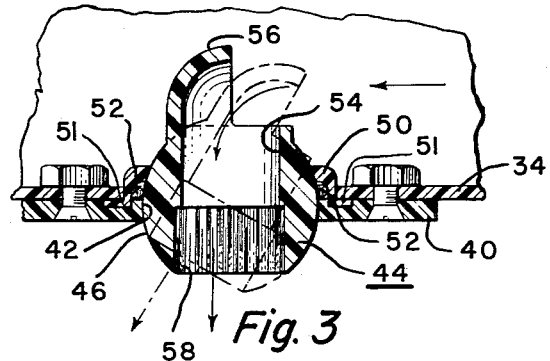
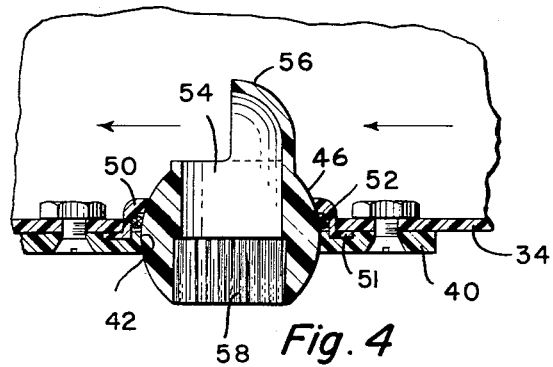
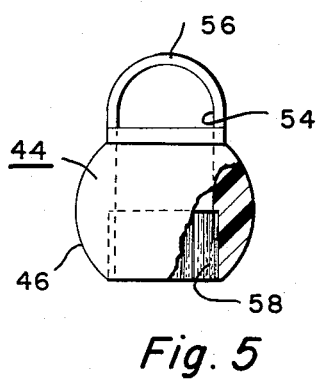
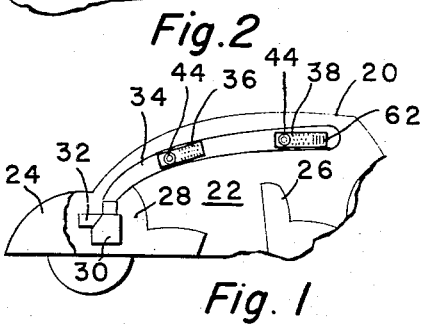

INVENTOR.
Lloyd E. Muller.
BY Willis, Hardman & Fehr
Attorneys

United States Patent Office 2,747,495
Patented May 29, 1956

2,747,495

REFRIGERATED AIR DISTRIBUTING APPARATUS

Lloyd E. Muller, Flint, Mich., assignor to General Motors Corporation, Detroit, Mich., a corporation of Delaware Application December 26, 1952, Serial No. 328,037

4 Claims. (Cl. 98—2)

This invention relates to refrigerating apparatus and more particularly to an arrangement for distributing refrigerated air within the passenger compartment of an automobile.

In view of the variable nature of the high sun load encountered in an automobile and in view of the differences in the likes and dislikes of individual passengers of an automobile it becomes very difficult to maintain comfort for all of the passengers under normal driving conditions when using the air distributing arrangements heretofore used. It is an object of this invention to provide means whereby it is possible for individual passengers to closely control their own air conditioning.

It is also an object of this invention to provide a low cost multiple purpose air distributing duct and grill arrangement which makes it possible to attain the above mentioned object with a minimum amount of cost.

More particularly it is an object of this invention to provide a pair of air distributing ducts on opposite sides of the passenger compartment on the car and to provide a plurality of molded plastic air outlet devices for controlling the quantity and direction of the air discharged into the various parts of the passenger compartment.

Still another object of this invention is to provide for a multiple purpose air distributing arrangement which is out of the way and requires a minimum amount of space.

Further objects and advantages of the present invention will be apparent from the following description, reference being had to the accompanying drawings, wherein a preferred form of the present invention is clearly shown.

In the drawings:

Figure 1 is a fragmentary sectional view somewhat diagrammatic showing the general arrangement of the air distributing ducts in a passenger compartment of the car;

Figure 2 is an elevational view showing the construction of an air grill of the type mounted opposite the front seat of the passenger compartment;

Figure 3 is a fragmentary sectional view taken substantially on line 3—3 of Figure 2;

Figure 4 is a view similar to Figure 3 but showing the air deflector in the "off" position;

Figure 5 is an elevational view with a part broken away showing the air deflector element per se;

Figure 6:
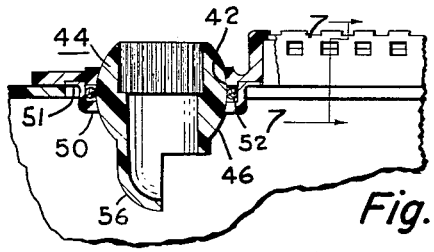
Figure 6 is a side view partly in section and partly in elevation of the air grills shown in Figure 2.
Figure 7:
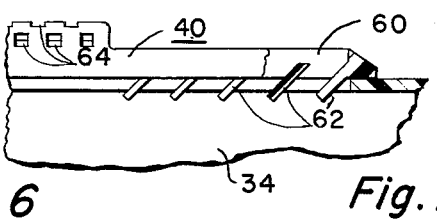
Figure 7 is a sectional view taken substantially on line 7—7 of Figure 6.

Referring now to the drawings wherein a preferred embodiment of my invention has been shown, reference numeral 20 generally designates an automobile having a passenger compartment 22 and a luggage compartment 24. Front and back seats 26 and 28 respectively are provided within the passenger compartment 22 and an air cooling unit 30 is mounted in the luggage compartment 24 as shown. Inasmuch as the construction of the air cooling unit 30 per se may be varied considerably without departing from the spirit of my invention, the details thereof have not been shown. However, reference is hereby made to pending application Serial No. 266,718, filed January 16, 1952, for a description of the air conditioning unit.

Suitable fan means such as the fan means 32 shown in Figure 1 causes the conditioned air to flow into a pair of air distributing ducts 34 located on opposite sides of the passenger compartment as generally shown in Figure 1 of the drawing. Whereas only one duct is visible in the drawing, it is to be understood that a similar duct is provided on the other side of the passenger compartment.

A first multiple purpose air distributing grill 36 is mounted in each of the ducts opposite the back seat of the passenger compartment and a second multiple purpose air distributing grill 38 is mounted in each of the ducts opposite the front seat of the passenger compartment.

The air distributing grill 38 has been shown in detail in Figures 2 through 7 of the drawing and as indicated therein it includes an escutcheon plate 40 which consists of a one-piece molded plastic element having an air deflector socket 42 provided adjacent its one end. An air deflector 44 is supported within this socket for controlling the direction and quantity of air flowing therethrough. As best shown in Figures 3 through 6, the air deflector consists of a one-piece molded plastic element having a semi-spherical surface 46 which together with a washer-like element 50 supports the deflector for universal movement within the socket 42. The washer-like element 50 is provided with a flange 51 which is clamped between the escutcheon plate 40 and the wall of the duct 34 so as to be held in place thereby. A washer 52 which is preferably made of felt is provided as shown for frictionally engaging the air deflector so as to hold it in adjustment.

A central passage 54 extends through the main body of the air deflector and serves as an air passage. A scoop-like projection 56 is provided at the inner end of the air deflector so as to project into the air duct in a manner to deflect air from the air duct into the air passage 54 when the open side of the scoop 56 faces the incoming air. By rotating the air deflector so as to have the open side of the scoop face away from the incoming air, little or no air will flow through the deflector. A portion of the inner wall of the passage 54 is knurled as indicated at 58 so as to make it possible for one to get a good grip on the air deflector 44 for rotating the deflector by hand so as to control the quantity of air picked up by the scoop.

It is obvious that in addition to controlling the quantity of air picked up, one can control the direction of the air flow by properly adjusting the air deflector within its socket. Thus, in Figure 3 of the drawing, the solid line showing shows the deflector arranged to discharge the air in a direction perpendicular to the face of the air duct whereas the dot-dash line showing shows the deflector arranged to discharge the air at an acute angle relative to the face of the duct. Figure 4 of the drawing shows the deflector arranged in a position which may be termed the "off" position wherein the inlet to the scoop is faced away from the incoming air.

At the front end of the escutcheon plate 40, air outlet slots 60 are provided as shown. Air deflectors 62 serve to direct the air flowing therethrough towards the front of the passenger compartment so as to cause a blast of air to sweep the windshield of the car. The mid-portion of the escutcheon plate 40 is provided with three rows of air outlet slots 64 which are arranged on a curved surface in such a manner that one curtain of air is directed upwardly towards the ceiling of the passenger compartment and another curtain of air is directed downwardly along the side of the passenger compartment directly opposite the driver's seat and some of the air is directed outwardly towards the driver. Since the driver's seat is always occupied when the car is in use and since the amount of air which will normally be discharged through the outlets 60 and 64 is the minimum amount required to provide comfort for the driver, these do not need any shutters for closing off the flow of air therethrough. However, the driver may control the flow of air flowing through the deflector 44 opposite the driver's seat both as to volume and direction. In other words, the driver can, for example, set the deflector 44 opposite his seat to direct a full blast of air directly towards his face or any other portion of his person or can shut off this source of air completely.

Provision has been made whereby the driver can shut off all air flow into the back portion of the passenger compartment. Thus the air outlet grill 36 mounted adjacent the rear portion of the passenger compartment is provided with an air deflector 44 similar to the air deflector 44 hereinabove described which makes it possible to cut off the flow of air therethrough and it is also provided with a series of air outlet slots 70 somewhat similar to the slots 64 as described in connection with the front air grill 38. These slots 70 are formed in the escutcheon plate 72 which serves to support the air deflector 44. Inasmuch as the air deflector 44, which is used for the back seat, is identical to the corresponding air deflector used adjacent the front seat, it will not be described in detail. The flow of air through the air outlet slots 70 is controlled by a pivoted shutter or damper-like element 74 which has slots 76 formed therein which may be set to register with slots 70 in the escutcheon plate 72 whereby all of the outlets 70 are open. However, when the shutter 74 is shifted into its uppermost position all of the air outlets 70 will be blocked thereby, with the result that no air will discharge therethrough.

Figure 8:
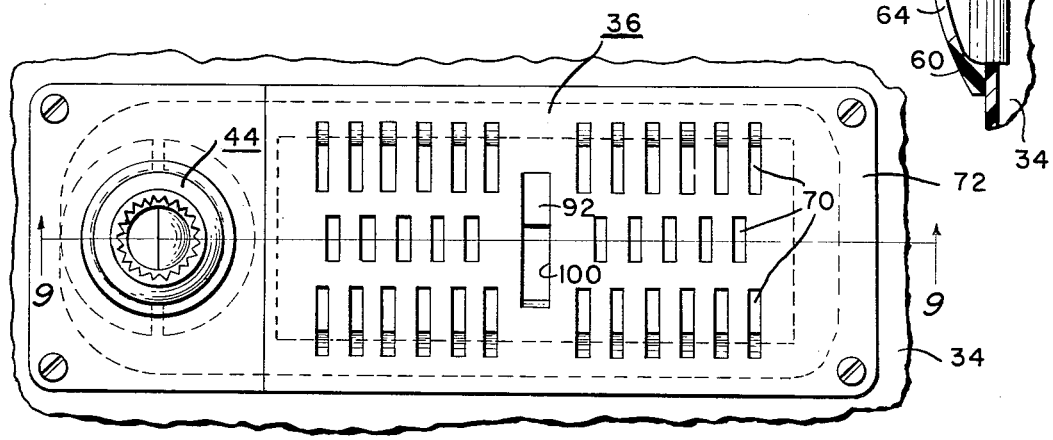
Figure 8 is an elevational view showing an air grill of the type used adjacent the rear seat to the passenger compartment.
Figure 9:
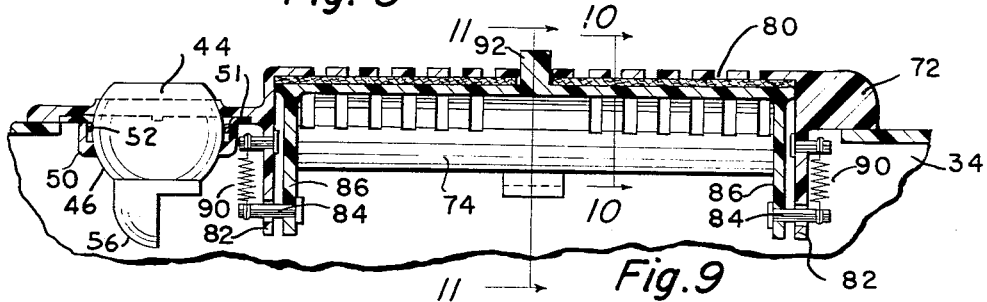
Figure 9 is a vertical sectional view taken substantially on the line 9—9 of Figure 8.
Figure 10:
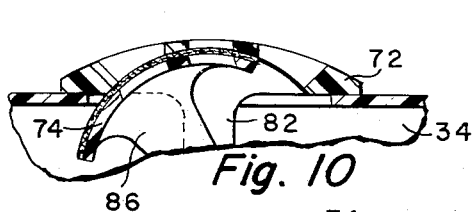
Figure 10 is a fragmentary sectional view taken substantially on line 10—10 of Figure 9.
Figure 11:
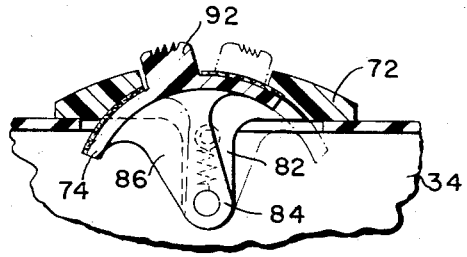
Figure 11 is a fragmentary sectional view taken substantially on line 11—11 of Figure 9.
Figure 12:
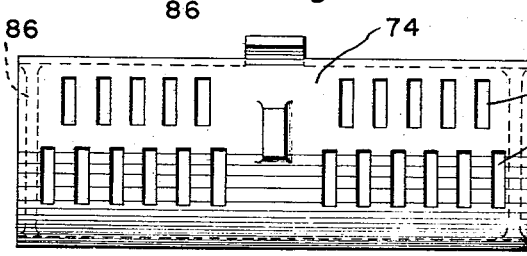
Figure 12 is a plan view of the shutter shown in Figure 9.

A felt facing 80 is provided on the face of the shutter 74 so as to prevent the shutter from shifting of its own accord during travel. The escutcheon plate 72 is provided with integrally formed projections 82 which serve to pivotally support trunnions 84 carried by projecting arms 86 integrally formed with the shutter element 74. Spring means 90 serve to hold the shutter element 74 in engagement with the back side of the escutcheon plate 72 as best shown in Figure 9. The shutter 74 is provided with a handle 92 which projects through a slot 100 in the escutcheon plate 72 as best shown in Figure 8.

By virtue of the above described construction, complex air distributing grills capable of controlling both the volume and direction of air flow may be made very inexpensively. A minimum number of parts are required and these have been so designed that they may be made of plastic in the simplest type of molds.

While the form of embodiment of the invention as herein disclosed constitutes a preferred form, it is to be understood that other forms might be adopted, as may come within the scope of the claims which follow.

What is claimed is as follows:

1. In a system for conditioning the air for the passenger compartment of an automobile having a front seat and a back seat; an air distributing duct extending along the side wall of said passenger compartment at an elevation above said seats; said duct having a first air outlet adjacent said back seat; a first outlet grill for said first air outlet comprising an air deflector supporting socket adjacent one end thereof, an air deflector mounted in said socket for adjustably directing one portion of the incoming air in any desired direction; said air deflector including means for shutting off the flow of air therethrough; one portion of said first grill having a curved surface provided with first series of outlets for directing a curtain of air towards the ceiling of the passenger compartment and second series of outlets for directing a curtain of air downwardly adjacent the side wall of said compartment, and means for shutting off the flow of air through said first and second series of outlets; said duct having a second air outlet adjacent said front seat; and a second outlet grill for said second air outlet comprising an escutcheon plate having an air deflector supporting socket adjacent one end thereof, an air deflector mounted in said last named socket for adjustably directing one portion of the incoming air in any desired direction; an air outlet grill formed adjacent the opposite end of said escutcheon plate, said outlet grill having fixed louvers integrally formed with said last named plate for directing a second portion of the incoming air in a direction forwardly relative to said front seat; the mid-portion of said last named escutcheon plate having a curved surface provided with first outlet means for directing a curtain of air towards the ceiling of the passenger compartment and second outlet means for directing a curtain of air downwardly adjacent the side wall of said compartment.

2. A conditioned air outlet grill for use in a conditioned air distributing duct located adjacent the driver's seat in the passenger compartment of an automobile comprising a molded plastic escutcheon plate having an air deflector supporting socket adjacent one end thereof, an air deflector mounted in said socket for universal movement therein for adjustably directing one portion of the incoming conditioned air in any desired direction, an air outlet grill formed in said plate, said outlet grill having fixed louvers integrally formed with said molded plate for directing a second portion of the incoming conditioned air in a direction forwardly relative to the driver's seat, one portion of said plate having a curved surface provided with first outlet means for directing a curtain of air towards the ceiling of the passenger compartment above the driver's seat and second outlet means for directing a curtain of air downwardly adjacent the side wall of the compartment.

3. A conditioned air outlet grill for use in a conditioned air distributing duct located adjacent the driver's seat in the passenger compartment of an automobile comprising a molded plastic escutcheon plate having an air deflector supporting socket adjacent one end thereof, an air deflector mounted in said socket for adjustably directing one portion of the incoming air in any desired direction, one portion of said plate having a curved surface provided with first outlet means for directing a curtain of air towards the ceiling of the passenger compartment and second outlet means for directing a curtain of air downwardly adjacent the side of said compartment, and means for regulating the flow of air through said first and second outlet means.

4. In combination, a conditioned air distributing duct for use in the passenger compartment of an automobile, said duct having an aperture adjacent a seat of the automobile, a molded plastic escutcheon plate mounted adjacent said aperture and supported by said duct, said plate having an air deflector socket adjacent one end thereof, an air deflector mounted in said socket for adjustably directing one portion of the incoming air in any desired direction, one section of said plate having a curved portion provided with first outlet means for directing a curtain of air towards the ceiling of the passenger compartment and second outlet means for directing a curtain of air downwardly adjacent the side of the passenger compartment, and means for regulating the flow of air through said first and second outlet means, said last named means comprising a curved damper element mounted directly behind the curved portion of said escutcheon plate and having a hand engaging projection extending through said escutcheon plate.

References Cited in the file of this patent

UNITED STATES PATENTS

| | | |
|---|---|---|
| 705,609 | Pugh | July 29, 1902 |
| 1,742,290 | Stark | Jan. 7, 1930 |
| 1,783,005 | Stewart | Nov. 25, 1930 |
| 2,189,502 | Johnston | Feb. 6, 1940 |
| 2,294,036 | Kettering | Aug. 25, 1942 |
| 2,320,596 | Henney | June 1, 1943 |
| 2,324,858 | Levine | July 20, 1943 |
| 2,516,805 | Rother et al. | July 25, 1950 |
| 2,524,974 | Hickmott | Oct. 10, 1950 |

FOREIGN PATENTS

| | | |
|---|---|---|
| 8,461 | Great Britain | Apr. 16, 1908 |
| 474,235 | Great Britain | Oct. 27, 1937 |
| 506,443 | Great Britain | May 30, 1939 |
| 662,360 | Germany | July 11, 1938 |